United States Patent [19]
Ehrat

[11] 3,990,558
[45] Nov. 9, 1976

[54] METHOD AND APPARATUS FOR PREPARING AND ASSESSING PAYMENT DOCUMENTS

[75] Inventor: Kurt Ehrat, Zurich, Switzerland

[73] Assignee: Gretag Aktiengesellschaft, Zurich, Switzerland

[22] Filed: Oct. 7, 1974

[21] Appl. No.: 512,999

[30] Foreign Application Priority Data
Oct. 8, 1973  Germany............................ 2350418

[52] U.S. Cl......................... 194/4 R; 194/DIG. 26; 235/61.7 B; 340/149 R
[51] Int. Cl.²...................... G07F 1/06; G07D 7/00
[58] Field of Search............ 194/4 R, 4 A, 4 B, 4 C, 194/4 D, 4 E, 4 F, 4 G, DIG. 9 B; 235/61.7 B; 340/147 R, 149 R, 149 A

[56] References Cited
UNITED STATES PATENTS

| | | | |
|---|---|---|---|
| 3,487,905 | 1/1970 | James......................... | 194/DIG. 9 B |
| 3,570,643 | 3/1971 | Maierhofer.................. | 194/DIG. 9 B |
| 3,648,020 | 3/1972 | Tateisi et al................ | 194/DIG. 9 B |
| 3,655,946 | 4/1972 | Morita et al. .............. | 194/DIG. 9 B |
| 3,697,729 | 10/1972 | Edwards et al............. | 194/DIG. 9 B |
| 3,845,470 | 10/1974 | Schuller...................... | 340/149 R X |

*Primary Examiner*—Robert B. Reeves
*Assistant Examiner*—Joseph J. Rolla
*Attorney, Agent, or Firm*—Pierce, Scheffler & Parker

[57] ABSTRACT

A method and apparatus is described for preparing and assessing machine readable payment documents such as bank or postal checks to avoid fraud. The checks are prepared by enciphering the serial number and the amount for which the check is made out with secret code data to provide a crypto number which is printed on the check with the serial number and the amount. The check is assessed as valid by reading out the printed data and enciphering the amount and serial number with the same secret code data as used when preparing the check to provide a crypto number which is compared with the crypto number read from the check. If the two crypto numbers are the same the check is assessed as valid.

The crypto number can be derived from additional data such as the credit card number of the person making out the check, the time and date and the number of the machine preparing the document.

8 Claims, 4 Drawing Figures

METHOD AND APPARATUS FOR PREPARING AND ASSESSING PAYMENT DOCUMENTS

FIELD OF THE INVENTION

This invention relates to a method of preparing and evaluating mechanically readable payment documents and apparatus therefor.

Present-day systems of payment use bank or postal cheques. As a general rule, the genuinesess of said documents is assessed by the signature of the person drawing the cheque. Similarly, the validity of a receipt given a person making a payment is determined by a signature which is normally the signature of a bank counter clerk.

Since signatures are relatively easy to counterfeit it is, in practice, very difficult to fully automate cheque payment systems, because of the complex and expensive equipment needed to check the genuineness of signatures.

OBJECT OF THE INVENTION

It is an object of the invention to obviate these disadvantages by providing a method of and apparatus for preparing and evaluating payment documents by coding other information normally printed on such documents which can then be used to check the genuineness of the documents.

SUMMARY OF THE INVENTION

According to the invention a payment document has associated with it a specific item of information which is different for each payment document and which is referred to herein as a serial number. The serial number and the amount of the payment document are enciphered with secret code data by logical association, the result of the enciphering referred to herein as the crypto number is applied in mechanically readable form to the payment document together with the amount and the serial number. To check the genuineness of the document so prepared its crypto number, amount and serial number are read mechanically and the amount and the serial number are enciphered with an identical secret code data as that used in preparing the document by logical association. The crypto number yielded as a result of the enciphering is compared with the crypto number read from the payment document and if the latter is the same as the former the payment document is assessed as valid.

Since the crypto number depends upon the amount, serial number and secret code and is unambiguously defined by these three items of information, the mathematical relationship between the amount, the serial number and the crypto number cannot be discovered unless all these items of information, including the secret code, are known.

In an embodiment of the invention to be described in detail later on, the serial number of the payment documents being evaluated is read and stored, and the serial number of each payment document to be evaluated is then compared with all the stored serial numbers. In the event of non-coincidence with any of the stored serial numbers, the serial number of the document to be evaluated is stored and the payment document is assessed as valid if the read serial number does not agree with any of the previously stored numbers.

The advantage of this method is that it provides complete security against duplication. A dishonest person who has drawn a document for a particular amount when the method according to the invention is in use would of course realise that such amount and the serial number printed on his payment document at the time has given rise to the crypto number printed on the document at the time. He could therefore duplicate the previous document, and since the relationship between, on the one hand, the amount and serial number and, on the other hand, the crypto number is correct, the duplicate could not be detected as false. However, a serial number check excludes this possible form of fraud since the evaluation or assessment of the payment document would disclose that the serial number had already been used once.

The invention also relates to an apparatus for performing the method and comprising a document-appearing apparatus and a document-assessing apparatus. In such apparatus, the document-preparing apparatus has means for positioning a payment document, means for writing in the amount appearing on the document, means for producing a serial number, an enciphering device having provision for producing secret code information, means for introducing the amount and the serial number into the enciphering device and means for indicating the amount, the serial number and the crypto number on the documents. The document-assessing apparatus has means for positioning a document, means for reading the amount appearing thereon, the serial number and the crypto number, an enciphering device for producing the same secret code information as in the document-preparing stage and in the same way means for introducing the amount and the serial number into the enciphering device and means for comparing the crypto number read from the payment document with the crypto number obtained in the enciphering device.

DETAILED DESCRIPTION OF THE PREFERRED EMBODIMENTS

Figure 1:
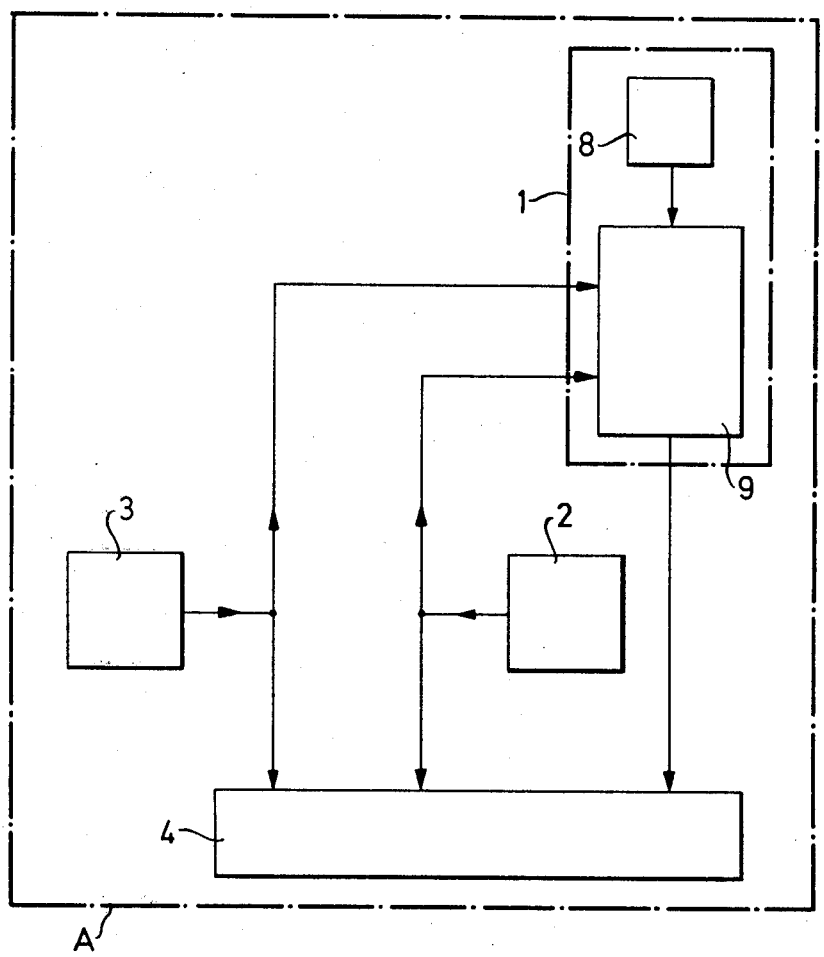
FIG. 1 is a block schematic diagram of a document-preparing apparatus and an associated document.
Figure 1:
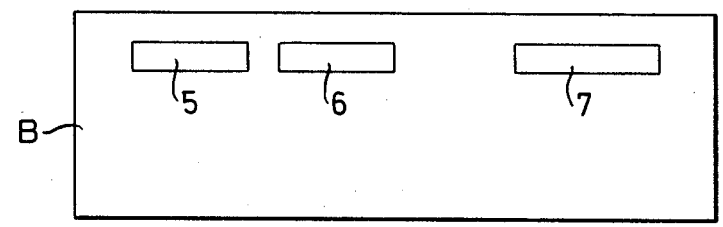

Referring to FIG. 1, a document-assessing apparatus A comprises an enciphering device 1, a serial number producer 2, a data write-in stage 3 and a document print-out device 4. Document B has three information panels 5 to 7 for receiving data relevant to the document; panel 5 receives the amount, panel 6 the serial number and panel 7 the crypto number.

The enciphering device 1 comprises a secret code store 8 and a code pulse calculator 9 having three inputs and one output. Its first input is connected to the output of store 8, its second input is connected to the output of stage 3 and its third input is connected to the serial number producer 2. The outputs of the units 9, 3 and 2 are all connected to the print-out device 4.

Preferably, the stage 3 comprises a keyboard and the serial number producer 2 is an electronic counter. The units 8 and 9 are of the kind used in the information-coding art. Units of this kind are disclosed, for instance in Swiss Patent Specification Nos. 392,617 (and its corresponding U.S. Pat. No. 3,657,477), 402,937 (and its corresponding U.S. Pat. No. 3,291,908), 408,109 (and its corresponding U.S. Pat. No. 3,678,198), 411,983 (and its corresponding U.S. patent application Ser. No. 401,795 filed Oct. 6, 1964), 422,047 (and its corresponding U.S. patent application Ser. No. 420,393 filed Dec. 22, 1964) and 530,742 (and its corresponding U.S. Pat. No. 3,740,475).

Preferably, the device 4 is a printing mechanism which prints optically detectable numerals on the document. It could be a magnetic head for writing data on the document in the appropriately encoded form on a magnet track or it could be a perforater punching the data in an appropriate encoded form in the document.

The apparatus described operates as follows:

A client wishing to prepare a document for paying in or paying out introduces an unprinted document form into the apparatus by sliding it in through a slot. The required amount is then typed on to the document by means of the keyboard 3. The amount is printed by the printing mechanism 4 in the panel 5 of the document and applied to the second input of the code pulse calculator 9. Serial number producer 2 produces a serial number which the mechanism 4 prints in panel 6 of the document and which is applied to the third input of calculator 9. Preset at the first input of the calculator 9 is the secret code information from the store 8, such information being logically associated in the calculator 9 with the data information items representing the amount and the serial number. This association leads to the crypto number being obtainable at the output of the calculator 9. The mechanism 4 prints the crypto number in the panel 7 to complete the preparation of the document.

Since the crypto number is dependent upon, and unambiguously defined by, the amount, the serial number and the secret code, it is impossible to discover the mathematical relationship between these three items (including the secret code) unless all of them are known. However, since the secret code is by hypothesis secret, it is virtually impossible so to falsify the amount and/or serial number and/or crypto number to achieve the correct relationship determined by the secret code between, on the one hand, the amount and the serial number and, on the other hand, the crypto number.

Figure 2:
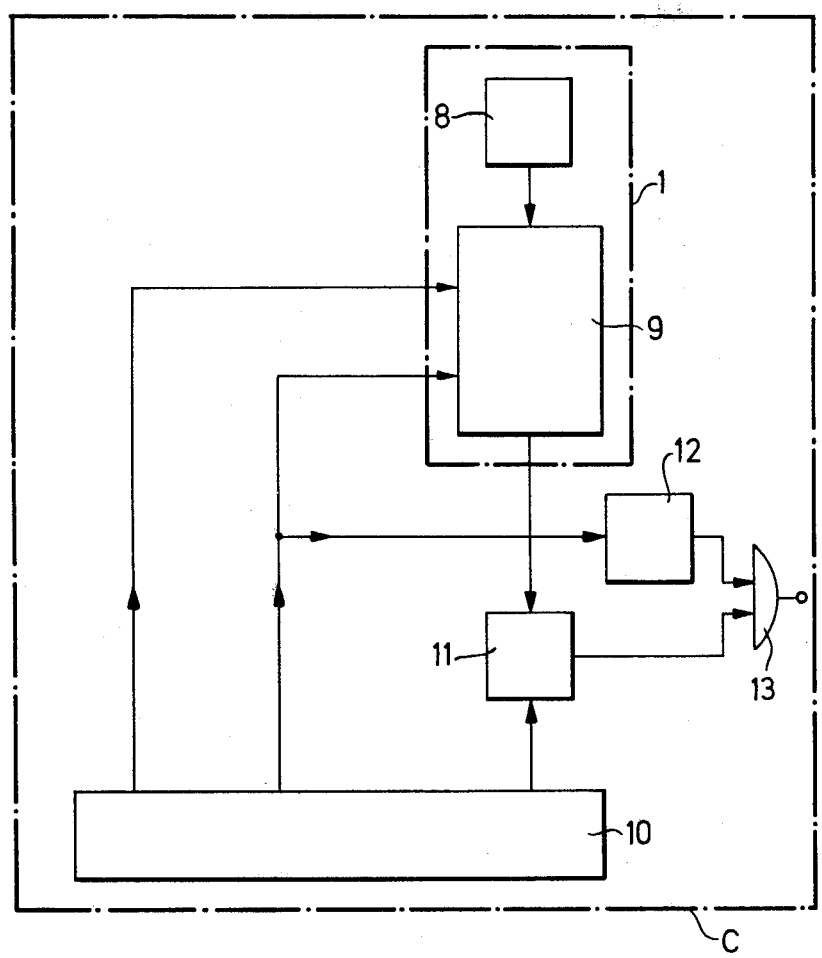
FIG. 2 is a block schematic diagram of a document-evaluating apparatus and an associated document.
Figure 2:
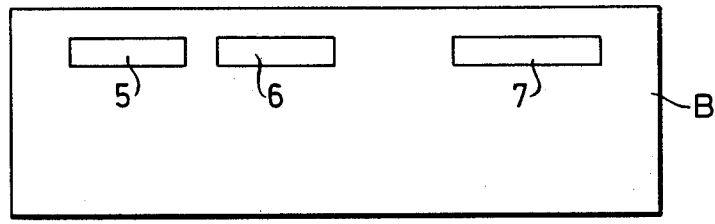

Referring to FIG. 2, a document-evaluating device C comprises an enciphering device 1 having a secret code store 8, the same as store 8 in apparatus A, and a code calculator also the same as calculator 9 in the apparatus A. The device C also comprises a document reader 10, a crypto number comparator 11, a serial number testing and storing stage 12 and an AND gate 13.

The document reader 10 has means (not shown) for receiving the document, such as a sliding drawer which aligns the panels 5 to 7 of the document B inserted into the drawer in the sensing zone of the document reader 10. As illustrated, the reader 10 has three outputs; the information contained in panel 5 — i.e., the amount — is conveyed via the first output to the second input of the calculator 9, the information in panel 6, i.e., the serial number — is conveyed via the second output to the third of the calculator 9 and to the input of stage 12, and the information in panel 7, i.e., the crypto number — is conveyed via the third output to one output of comparator 11. The other input of comparator 11 is connected to the output of calculator 9. The output of stage 12 and the output of comparator 11 are each connected to one input of AND gate 13.

When a document is introduced into the apparatus, the reader 10 reads the three panels 5 to 7. The crypto number information is obtained from the amount and serial number data items in the calculator 9 in a manner similar to that in the document-preparing apparatus A of FIG. 1. Comparator 11 compares the crypto number information obtained in calculator 9 with the crypto number read from panel 7 and if the two crypto numbers are the same, the comparator 11 produces an output signal which is applied to one output of AND gate 13. The serial number read from panel 6 is checked in stage 12 for first appearance. If stage 12 discovers that a serial number which has just been read is occurring for the first time, stage 12 applies an output signal to AND gate 13. When the two inputs of AND gate 13 each receive a signal it produces an output signal to signify that the payment document is evaluated as genuine.

The stage 12 stores either all the possible serial numbers or all the serial numbers read from payment documents within a predetermined time interval before checking the particular documents concerned. Preferably, the time interval correspnds to the period of time within which a payment document must be evaluated if it is to be valid; for instance the time within which a drawn cheque must be cashed. The secret code can be altered after such a time interval. In a first mode of operation stage 12 evaluates the serial number read from panel 6 as genuine only if that serial number does not coincide with any of the serial numbers in store. Every serial number found not to coincide with a serial number already in store is itself stored. In a second mode of operation the serial number read is assessed as genuine when there is coincidence between it and any stored serial number, and is cancelled in the store of the stage 12. For improved security, both modes can be operated in parallel in which case both the signals produced can be applied to an additional AND gate on the second input of AND gate 13.

A system for checking and evaluating documents as described above is of use, for instance, in a clearing centre where all the cash sums of subscribers are entered and where mechanical checking of this kind to see whether the documents are genuine has the advantage of saving considerable time and providing greater security over visual assessment of cheque signatures by counter officials and in automatic cash-issuing machines in which, once a document has been found to be genuine, the amount stated thereon is paid out automatically.

As already mentioned, the documents cannot be falsified because the amount and the serial number is associated with the crypto number in a non-detectable way so that in the event of unauthorized tampering with the amount, the crypto number ceases to be correct and the crypto number associated with the altered amount cannot be found unless the secret code is known.

To ensure that the stated amount is not paid out more than once on a copied document, the serial number is checked too. In this check a document is assessed as genuine only if the serial number read from it occurs for the first time. Any document can be evaluated only once, copies and duplicates being assessed as false.

Consequently, documents prepared by this method can be read mechanically and evaluated for genuineness and they cannot, without extreme difficulty, be counterfeited or duplicated.

Further mechanically readable particulars in addition to the amount and serial number can be printed on a document B and made proof against falsification by means of the enciphering device 1 and the crypto number. In the case of documents used in automatic payment system, such additional particulars can be:

the account number to be debited with the amount;
the reference number to which the account is to be credited;
the date of drawing of the document; and
the number of the device in which the document has been prepared.

To ensure that in the event of a completely prepared document being lost an unauthorized person cannot use it to draw cash from an automatic cash pay-out machine, information identifying the drawer can be entered into the enciphering device 1 but not printed on the document, the information comprising, for example, the credit card number of the rightful owner of the document, the pay-out date and time and the number of the pay-out automat. These three items of information which affect the preparation of the crypto number and which do not appear on the document will therefore be unknown to an unauthorised person. Since the cash sum specified is paid out only when the proper person has the document evaluated at the right place and at the right time, a document of this kind would be proof against misuse by unauthorized persons.

Figure 3:
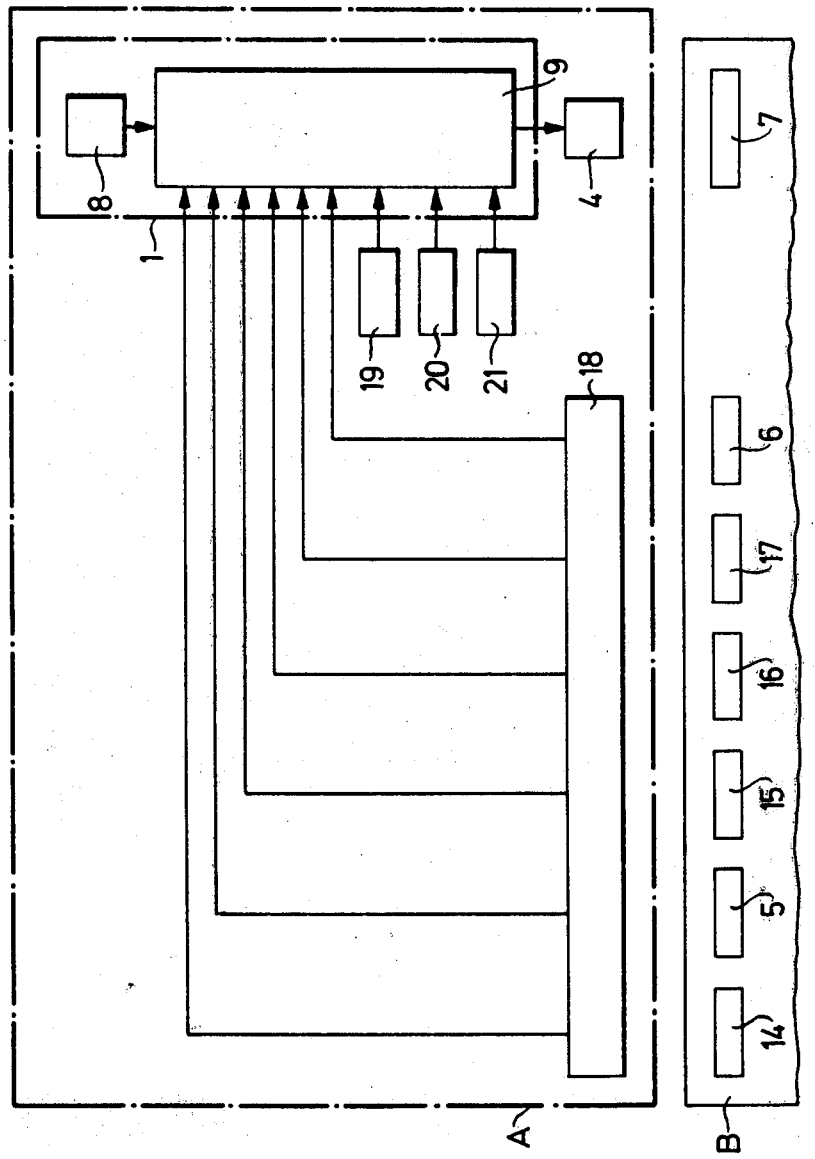
FIG. 3 is a block schematic diagram of a modification of the apparatus shown in FIG. 1 and an associated document.

FIG. 3 shows apparatus for preparing a document B carrying the above mentioned information. The document B has four extra information panels, a panel 14 for the account number, a panel 15 for the reference number, a panel 16 for the date on which the document is drawn and a panel 17 for the number of the document-preparing device. The account number, amount, reference number, serial number, date of drawing and number of the drawing or preparing device may be applied to the document in mechanically readable form before the document is actually prepared. For the actual preparation, these particulars are read by a document reader 18 and supplied to corresponding inputs of the calculator 9. To facilitate mechanical reading all the digits and numbers in the panels appear on the document in a single line.

In addition to the inputs previously described, calculator 9 has three other inputs 19 to 21. Identification information is introduced into input 19 by means of a keyboard, the pay-out date and time is applied to input 20 by means of an electric date clock and the number of the automatic pay-out machine is applied to input 21. From all these input data and from the secret code stored in store 8, calculator 9 calculates the crypto number which is written by document writer 4 in document panel 7.

The serial number can be coupled with the number of the document-preparing device or with the number of the evaluating device, so that when the documents are assessed only the serial numbers figuring amongst the numbers of these devices have to be checked. Also, the serial number of the documents can be associated with the date information so that serial numbers begin afresh daily and so only a reduced number of serial numbers have to be evaluated for first occurrence. The serial numbers can be associated with the account number or reference number.

The stored secret code can be fixed or can be varied automatically, for instance, in dependence on the date. The sequence of serial numbers can begin afresh for each alteration in the secret code and for each alteration in the date.

Figure 4:
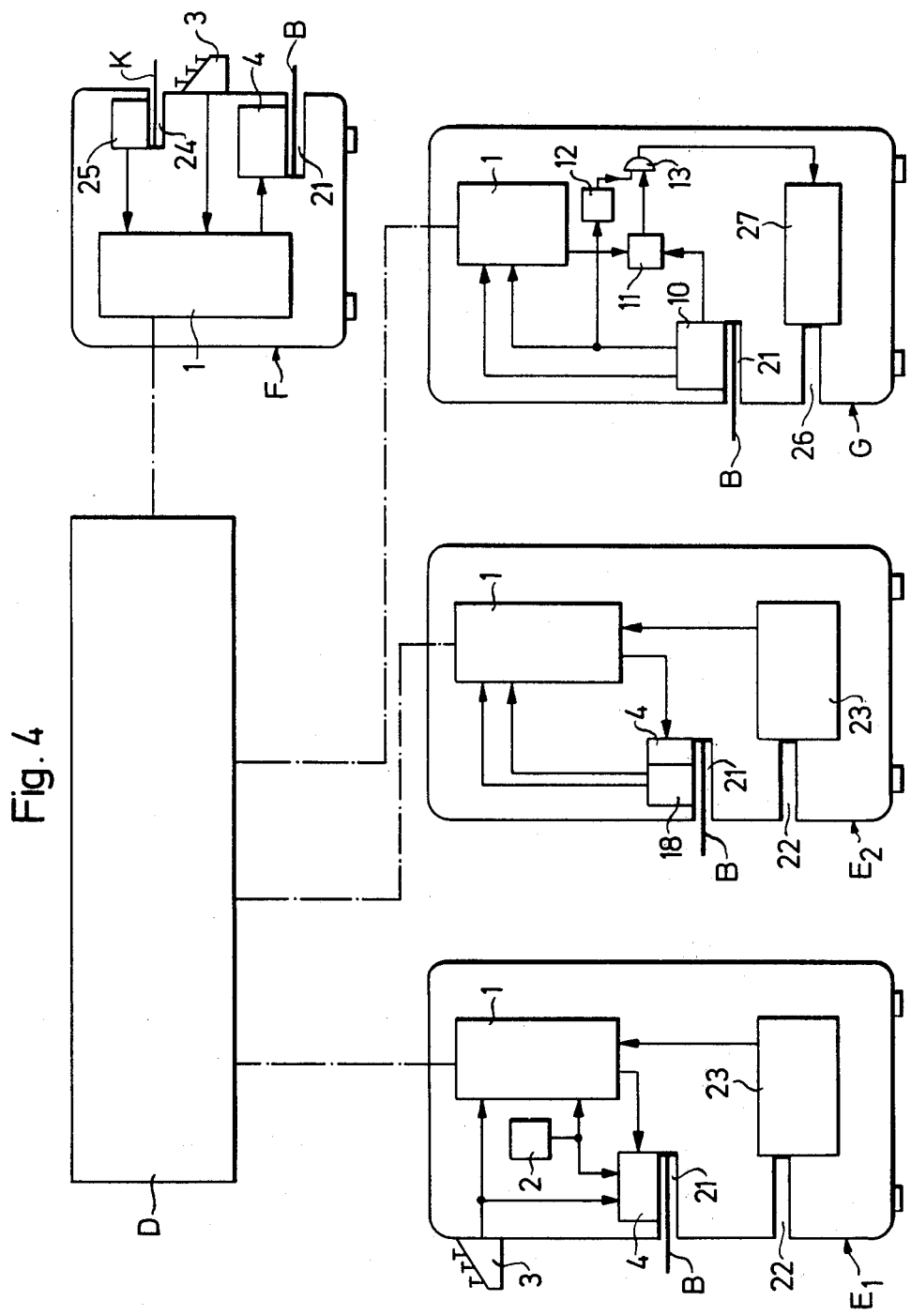
FIG. 4 is a block schematic diagram of apparatus for automatically paying in and paying out cash.

FIG. 4 shows a system for the automatic paying in and paying out of cash comprising two automatic cash paying-in machines $E_1$, $E_2$, a document-preparing facility F, an automatic cash paying-out machine G and a clearing centre D to which the automatic paying in and paying out machines and the document-preparing facility are electrically connected. The paying-in machine $E_1$ and the facility F have document-preparing devices of the kind shown in FIG. 1, while the centre D and the machine G have document-evaluating facilities of the kind shown in FIG. 2. It is not essential for there to be an electrical connection between the clearing centre and the various uatomatic machines.

In addition to the document-preparing device A of FIG. 1 the cash paying-in facility $E_1$ has a document slot 21, a paying-in slot 22 and a bank note tester 23, such as that disclosed in U.S. Patent No. 3,753,617, that data write-in stage 3 being in the form of a keyboard.

The automatic cash paying in machine $E_1$ operates as follows: a blank document B is placed in slot 21, the cash to be paid in is typed on keyboard 3 and printed by the document writer 4 and is supplied as an input to the digitizer 1. The serial number is produced in the serial number producer 2, printed on the document and supplied to enciphering device 1. Paid in bank notes are introduced by way of aperture 22. The paid in cash is tested by tester 23 for genuineness and amount. If the amount of cash paid in corresponds at least to the amount typed out, the cash tester applies to the enciphering device 1 a signal which causes the crypto number produced to be printed on the document as a non-counterfeitable and mechanically readable receipt. As described with reference to FIG. 3, the document can have an account number and/or reference number.

Also, the automatic machine can prepare the document in duplicate, one copy being given as a receipt to the person making the payment while the other copy goes to the clearing centre where the document is checked mechanically for genuineness in an evaluating device C of the kind shown in FIG. 2 and the cash sum is entered up. The document would be sent to the clearing centre in this way in the absence of an electrical connection between the automatic machine and the clearing centre.

If there is an electrical connection between the machine $E_1$ and the clearing centre D, in the form indicated in FIG. 4 by a chain-dotted line, the cash paid in can be entered up directly during the actual paying in. The document issued then serves as a receipt for the person making the payment. If the person making the payment has an account of his own and the account number is printed on the document as described with reference to FIG. 3, any change due to the person making the payment can be credited to him in the clearing centre. Change can also be given at the automatic machine but in this case the paying-in machine $E_1$ would have to be constructed appropriately.

The paying-in machine $E_2$ can process documents which have been prepared with all the necessary particulars, i.e., amount, serial number and possibly account number, except for the crypto number externally of the machine. To receive these particulars and to write them into the enciphering device 1 the machine $E_2$ has a document reader 18 which is shown in FIG. 3. So far as the document slot 21, enciphering device 1, cash entry slot 22 and bank note tester 23 are concerned, machine $E_2$ is identical with machine $E_1$, and the operation of the two machines is identical except for the introduction of the document data and for the absence of an indication of the amount and serial number on the document. The only function of the document writer 4 is to print the crypto number on the document. Of course, the machine $E_2$ could have a serial number producer and produce the serial number itself instead of reading it from the document by means of the reader 18.

The document-preparing device F serves to prepare documents similar to the document shown in FIG. 3 and has, in addition to the enciphering device 1, serial number producer 2, write-in keyboard 3, reader 4 and slot 21, a slot 24 for receiving a credit card K identifying the person making out the document and a credit card reader 25.

The documents prepared by means of the device F can be used, for instance, as order checks to transfer the amount stated on the document from the account of the drawer (account number) to the account of the person receiving the money (reference number). The identification data derived from the drawer's credit card together with the amount and other particulars on the document, serve as the drawer's "signature" in the crypto number produced in enciphering device 1. The completed order cheque is despatched to the clearing centre if the document-preparing facility is not electrically connected thereto. If there is an electrical connection between centre D and device F the requisite book-keeping operations are done "one line" in the clearing centre.

A document B prepared in the device F can be used as a cheque for drawing cash from an automatic cash pay-out machine G. In this case the device F has a "on line" connection with the clearing centre D so that the latter can check the state of the drawer's account. In addition to the document-evaluating device C of FIG. 2, the machine G has a document slot 21, a cash delivery slot 26 and a cash delivery facility 27. The ouptut of the AND gate 13 in the device of FIG. 2 is connected to the input of the cash delivery facility 27.

A cheque for the payment of cash prepared in a document-preparing device F is placed in slot 21. The reader 10 reads all the particulars present on the document and such particulars are processed in the enciphering device 1 and in the stage 12, as described with reference to FIG. 2. The output signal of AND gate 13 causes automatic pay out of the amount on the document.

As a rule, the automatic machines for receiving and paying out cash are in the form of armoured cabinets.

As already stated, the clearing centre D has an evaluating device of the kind shown in FIG. 2 and can also have all the facilities found in a conventional up-to-date clearing centre. For instance, the credit card numbers and account numbers of every client can be stored at the clearing centre. If the centre has an on-line connection with all the other facilities, i.e., with the document-preparing facilities and with the automatic machines for each paying in and paying out cash, the serial number producer and the stage which checks and stores serial numbers and the enciphering device for all the facilities can all be located at the clearing centre so that the automatic machines for paying in and paying out cash can be of very simple construction.

The crypto number can be used as a testing number to secure payment so that any such digit in the amount or serial number or crypto number that has been incorrectly printed, or transmitted or read is immediately detected as incorrect in the evaluation.

What is claimed is:

1. A system for preparing and assessing payment documents, comprising:

A. at least one document-preparing apparatus including
      a. first means for positioning a payment document,
      b. means for writing on the positioned document,
      c. means for producing a serial number,
      d. first means for enciphering,
      e. first means for introducing an amount and the serial number into the means for enciphering;
      the first enciphering means comprising an electronic code pulse calculator and a secret code store and producing a crypto number from a secret code information, the serial number and the amount,
      the output from the first enciphering means and the first means for introducing the amount and the means for producing the serial number controlling the means for writing in order to write the amount, the serial number and the crypto number on the positioned document; and further comprising:

B. at least one document-assessing apparatus including
      a. second means for positioning a payment document,
      b. means for reading from a positioned document,
      c. second means for enciphering,
      d. means for comparing, said comparing means having first and second inputs,
      said second means for enciphering producing the same information as the first means for enciphering provided the input is the same,
      the reading means for reading the amount, the serial number and the crypto number appearing on the positioned document and being connectd to the inputs of the second enciphering means as well as to the first input of the comparing means,
      the second enciphering means producing a crypto number from the same secret code information as in the document preparing stage, the amount just read and the serial number just read,
      the first input of the comparing means being connected to the reading means and the second being connected to the output fo the second enciphering means,
      said means for comparing checking the genuineness of the document.

2. A system according to claim 1, wherein the document-preparing apparatus includes means for the introduction of an information carrier, such as a credit card identifying the person preparing the payment document.

3. A system according to claim 1, wherein the means for producing a serial number comprises an electronic counter.

4. A system according to claim 1, wherein the means for comparing includes a store for storing each serial number that has been read and not already present in the store, with an AND gate having one of its two inputs connected to the store and the other input to the reading device, and wherein in the event of a serial number just read and the serial numbers previously stored not coinciding the AND gate will produce an output signal which controls the enciphering means.

5. A system according to claim 1, wherein the document-preparing apparatus is part of an automatic-pay-in device having an opening to receive bank notes and means for checking the amount and genuineness thereof with a bank-note testing device being connected to the enciphering means to control the transfer of the crypto-number to the writing means only if the amount of the bank notes introduced into the device is at least as great as the amount which is introduced into the means for writing in the document-preparing apparatus.

6. A system according to claim 1 wherein the document-assessing device is part of an automatic paying-out machine which includes apertures for the delivery of money and a money paying-out facility, said paying-out facility being connected to said comparing means and being operated whenever said comparing means states the genuineness of the document.

7. A system according to claim 1 wherein in addition to the amount and serial number, said first means for introducing serves to introduce further data comprising the date of preparation and the number of the preparing apparatus into said first enciphering means whereby the crypto number includes said further data.

8. A system according to claim 7 and wherein said writing means applies said additional data to the payment document in mechanically readable form.

* * * * *